(12) United States Patent
Braun et al.

(10) Patent No.: US 10,987,830 B2
(45) Date of Patent: Apr. 27, 2021

(54) FORMING STATION FOR A THERMOFORM PACKAGING MACHINE AND METHOD OF EXCHANGING A MALE DIE PART

(71) Applicant: MULTIVAC Sepp Haggenmüller SE & Co. KG, Wolfertschwenden (DE)

(72) Inventors: Jochen Braun, Erkheim (DE); Bastian Wanger, Pfronten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 389 days.

(21) Appl. No.: 16/120,577

(22) Filed: Sep. 4, 2018

(65) Prior Publication Data

US 2019/0070753 A1    Mar. 7, 2019

(30) Foreign Application Priority Data

Sep. 5, 2017  (DE) .................... 10 2017 120 355.9

(51) Int. Cl.
| | |
|---|---|
| *B29C 33/30* | (2006.01) |
| *B29C 51/30* | (2006.01) |
| *B29C 51/04* | (2006.01) |
| *B29C 51/08* | (2006.01) |
| *B29L 31/00* | (2006.01) |

(52) U.S. Cl.
CPC ............ *B29C 33/305* (2013.01); *B29C 51/04* (2013.01); *B29C 51/082* (2013.01); *B29C 51/30* (2013.01); *B29L 2031/712* (2013.01)

(58) Field of Classification Search
CPC ...... B29C 33/305; B29C 51/082; B29C 51/30
See application file for complete search history.

(56) References Cited

U.S. PATENT DOCUMENTS

| | | | | |
|---|---|---|---|---|
| 6,572,356 B2 * | 6/2003 | Seger | ................... | B29C 33/305 425/192 R |
| 2006/0223687 A1 * | 10/2006 | Hedin | ................... | B30B 15/028 483/28 |

FOREIGN PATENT DOCUMENTS

| | | |
|---|---|---|
| CN | 201026634 Y | 2/2008 |
| DE | 9017161 U1 | 3/1991 |

(Continued)

OTHER PUBLICATIONS

EP Search Report dated Jan. 18, 2019 (with English Machine Translation), Application No. 18 192 378.0-1014, Applicant MULTIVAC Sepp Haggenmueller SE & Co. KG, 16 Pages.

(Continued)

*Primary Examiner* — James Sanders
(74) *Attorney, Agent, or Firm* — Brooks Kushman P.C.

(57) ABSTRACT

A forming station for a thermoform packaging machine comprising a forming tool upper part with a die lid and a tool lower part. The forming tool upper part may comprises a male die part holding plate that has at least one male die part fixed thereto and which is displaceable along at least one rail provided on or in the die lid. The forming station may comprise a male die part drive drivingly connected to the male die part holding plate for generating a stroke movement of the male die part holding plate relative to the die lid. A guide element may be provided on the male die part holding plate, the guide element being movable relative to the male die part holding plate between an engagement position for engagement with an associated rail and a retracted position in which the guide element is disengaged from the rail.

12 Claims, 5 Drawing Sheets

(56) References Cited

FOREIGN PATENT DOCUMENTS

| | | |
|---|---|---|
| DE | 69704374 T2 | 10/2001 |
| DE | 10220700 A1 | 11/2003 |
| DE | 102005052913 B3 | 3/2007 |
| DE | 202011001623 U1 | 6/2012 |
| EP | 2052979 B1 | 5/2011 |
| EP | 2664429 A1 | 11/2013 |

OTHER PUBLICATIONS

EP Communication dated May 29, 2020 (with English Machine Translation), Application No. 18 192 378.0-1014, Applicant MULTIVAC Sepp Haggenmueller SE & Co. KG, 14 Pages.

\* cited by examiner

FORMING STATION FOR A THERMOFORM PACKAGING MACHINE AND METHOD OF EXCHANGING A MALE DIE PART

CROSS-REFERENCE TO RELATED APPLICATIONS

This Application claims priority to German Patent Application No. 10 2017 120 355.9 filed on Sep. 5, 2017 to Jochen Braun and Bastian Wanger, currently pending, the entire disclosure of which is incorporated herein by reference.

FIELD OF THE INVENTION

The present invention relates to a forming station having an exchangeable male die part and a method of exchanging a male die part at a forming station.

BACKGROUND OF THE INVENTION

Thermoform packaging machines are often provided with at least one forming station, in which troughs are formed by thermoforming in a packaging film/foil, normally a thermoformable plastic film/foil. In the case of comparatively thin films, it will suffice to apply a vacuum for thermoforming the film into troughs. In the case of thicker films, a male die part is often used, so as to at least support the forming of the film mechanically and thus accelerate the forming process.

Occasionally, it is desirable to have the possibility of exchanging such male die parts, so that packaging troughs with different geometries or different formats with different arrangements of the packaging troughs can be produced. A forming station of the generic kind allowing such exchange of a male die part is disclosed by EP 2 052 979 B1.

It is the object of the present invention to improve the exchange of a male die part at a forming station with regard to its handling as well as the subsequent operation of the forming station.

SUMMARY OF THE INVENTION

The forming station according to the present invention is characterized in that the male die part holding plate may have provided thereon at least one guide element that is movable relative to the male die part holding plate between an engagement position, in which the guide element is adapted to be brought into engagement with an associated rail on or in the die lid, and a retracted position, in which the guide element is out of engagement with the associated rail. In this way, the male die part holding plate and the at least one male die part fixed thereto may be selectively brought into engagement with the rail and, again selectively, be released from said engagement with the rail. In other words, the present invention allows, which is different than what is disclosed in the prior art, a selective coupling of the male die part holding plate to the rail—even if the male die part holding plate is located inside the forming tool upper part. This, in turn, offers the advantage that, as soon as the one or the plurality of guide elements are at their retracted position, the rail will no longer take part in the stroke movement of the male die part holding plate, which is generated by the male die part drive and by means of which thermoforming of the packaging troughs is caused. In particular, the male die part holding plate and the at least one male die part fixed thereto only has to be coupled to the rail, in the event that the male die part holding plate is to be exchanged, i.e. possibly a few times a day or a few times a week. When the forming station is in operation, the rail, however, need not take part in the stroke movement of the male die part holding plate. This reduces the weight that has to be moved by the male die part drive, often in several cycles per minute, and thus relieves the male die part drive.

It will be advantageous when a guide element may be provided not only on one side of the male die part holding plate, but when opposed sides of the male die part holding plate may have each provided thereon at least one guide element that is engageable with a respective rail associated with the side in question. In this way, the male die part holding plate with the possibly rather heavy male die part may be supported on two opposed sides during a tool changing operation, whereby the distribution of weight may be improved and tilting of the male die part holding plate may be prevented.

It may be expedient when the guide elements on the opposed sides of the male die part holding plate are movable synchronously and in opposite directions relative to one another. This allows establishing an engagement with the associated rail on both sides of the male die part holding plate, or releasing such an engagement.

Each individual guide element may, for example, be linearly movable between its engagement position and its retracted position, i.e. it may be configured as a slide element. Alternatively, it would be imaginable that the guide element is configured for being adjusted between its engagement position and its retracted position by a rotary movement. Superimposing a linear and a rotary movement would be imaginable as well.

It will be expedient when the at least one guide element is biased towards its engagement position by means of a spring. On the one hand, this will provide an increase in reliability, since the spring bias ensures that the male die part holding plate will enter into engagement with the rail via the guide element as soon as a drive of the guide elements is depressurized or deenergized, e.g. in the case of power failure. This reduces the risk of uncontrolled dropping of the male die part holding plate. On the other hand, biasing using a spring ensures that the engaged condition of the male die part holding plate and the rail will remain unchanged while the male die part holding plate moves along the rails. Furthermore, the spring may provide the advantage that the locked position will be assumed without any additional expenditure of energy, e.g. in the event of a machine emergency stop.

Preferably, the forming tool upper part may comprise a driver driving unit configured for driving the at least one guide element at least from its engagement position to its retracted position, optionally also in the opposite direction. It follows that, when the guide element is biased towards its engagement position, the driver driving unit will cause the guide element to move at least back from the engagement position.

According to a particularly simple and, consequently, advantageous variant, a driver driving unit may be provided, wherein the driver driving unit is common to a plurality of guide elements or even to all the guide elements. A synchronization of the movement of the guide elements may also be facilitated. In addition, it may increase the reliability of the locking function, if one of the guide elements should fail.

In one embodiment, the driver driving unit may be arranged on or in a base plate to which the male die part holding plate can releasably be connected for establishing a driving connection to the male die part drive. This has the advantage that the driver driving unit can remain in the forming station and can be used for different male die part holding plates, when the latter are exchanged for one another. Hence, in this embodiment, it is not necessary for each male die part holding plate to have its own driver driving unit for the drivers provided thereon.

It is imaginable that the driver driving unit may comprise at least one driver bar configured for moving into an opening of a guide element and for entraining the latter in its movement. In this way, the driver driving unit may be coupled temporarily to the guide element, without the necessity of coupling the two permanently. This, in turn, makes it easier to release the male die part holding plate from the forming tool upper part.

According to a particularly preferred embodiment of the present invention, the forming tool upper part, preferably the base plate, may have provided thereon a slotted link configured for raising the driver bar during extension of the driver bar and/or for lowering the driver bar during retraction of the latter. In other words, the slotted link may convert a (linear or pivoting) movement of the driver bar into a raising or lowering movement superimposed thereby. A lowering of the driver bar may allow the driver bar to move into the opening of the associated guide element. It also follows that the raising of the driver bar allows the driver bar to be released from the opening of the guide element.

In such a configuration, the driver driving unit may comprise a piston drive, which is motion-coupled to the at least one driver bar, or the vertical position of which depends on the raising and/or lowering of the at least one driver bar. This is advantageous insofar as the connection between the piston drive and the driver bar may have a particularly simple mechanical design, in particular in one embodiment, a mechanical design without a gear unit.

It proved to be advantageous when the male die part holding plate comprises an opening in which the guide element is accommodated in its retracted position. Such an opening may be provided for each guide element. It will be particularly expedient, when, in its retracted position, the guide element no longer protrudes beyond the outer contour of the male die part holding plate at the side. In this way, it is ensured that the guide element cannot interfere with the stroke movement of the male die part holding plate induced by the male die part drive.

The present invention relates not only to a forming station as such but also to a thermoform packaging machine including such a forming station.

The present invention also relates to a method of exchanging a male die part, which is fixed to a male die part holding plate, on a forming tool upper part of a forming station. The forming station may in particular belong to a thermoform packaging machine. The method comprises at least the following steps:

extending at least one guide element, which is provided on a first male die part holding plate, to an engagement position in which the guide element is in engagement with a rail provided on or in a die lid of the forming tool upper part, while the first male die part holding plate occupies a standby position inside the forming station;

moving the first male die part holding plate along the rail to a removal position;

removing the first male die part holding plate from the forming station;

attaching a second male die part holding plate, which has at least one male die part fixed thereto, to the rail at the removal position, so that at least one guide element provided on the second male die part holding plate will be in engagement with the rail in an engagement position;

moving the second male die part holding plate along the rail to the standby position inside the forming station;

fixing the second male die part holding plate to a base plate of the forming tool upper part;

after the second male die part holding plate has been fixed to the base plate: retracting the at least one guide element provided on the second male die part holding plate to a retracted position outside the rail.

Hence, this method of exchanging a male die part is, analogously to the claimed forming station, so conceived that the male die part holding plate is selectively coupled to or released from the rail on the die lid using the at least one guide element. In the condition coupled to the rail, the male die part holding plate can be moved out of the forming station along the rail serving as a guide or, vice versa, moved to its standby position inside the forming station. If, at the standby position, the coupling between the male die part holding plate and the rail is released by moving the guide elements to their retracted position, this engagement will no longer interfere with a subsequent stroke movement of the male die part holding plate, which is used for thermoforming a packaging material. A special advantage of the method is to be seen in that, thanks to the decoupling, the rail need not take part in the stroke movement of the male die part.

As has already been stated in connection with the explanation of the forming station, it may be an advantageous embodiment when respective guide elements provided on opposed sides of the first or second male die part holding plate are moved synchronously with one another.

Between its engagement position and its retracted position, each guide element can be moved either linearly or rotationally relative to the male die part holding plate. It would also be imaginable to superimpose a linear movement and a rotary movement.

Features described in connection with the claimed forming station may be realized individually or jointly also in the method according to the present invention, and vice versa.

Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
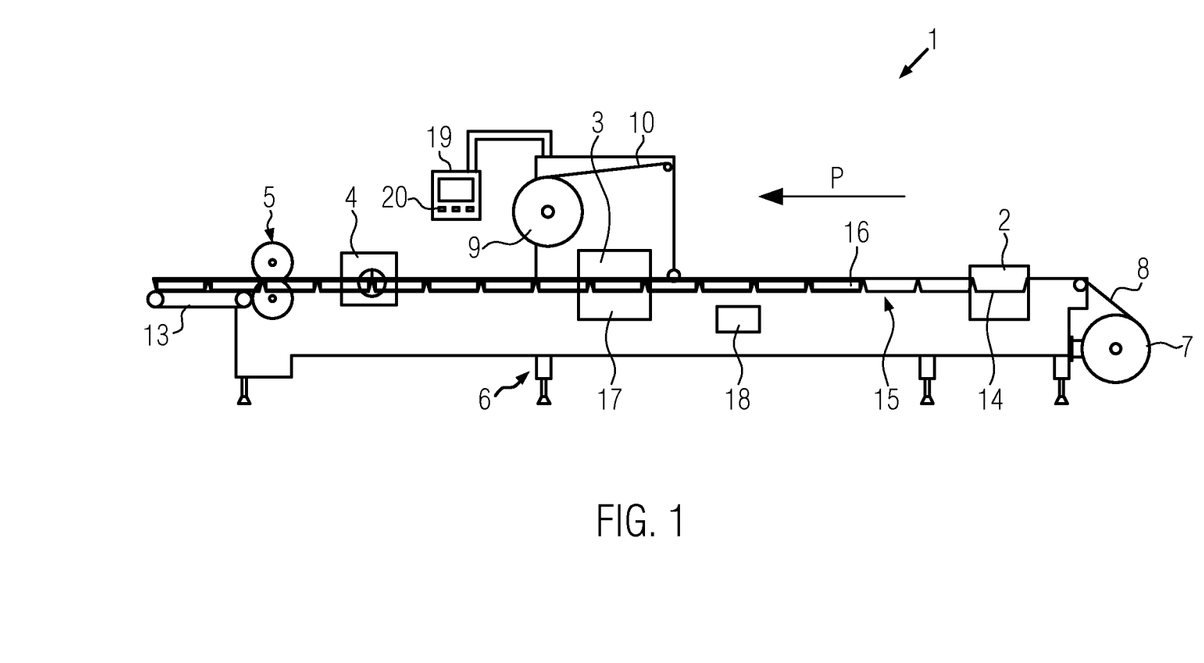
FIG. 1 is a schematic side view of one embodiment of the thermoform packaging machine in accordance with the teachings of the present disclosure.

FIG. 1 shows a schematic side view of a thermoform packaging machine 1. This thermoform packaging machine 1 comprises a forming station 2, a sealing station 3, a cross cutting unit 4 and a longitudinal cutting unit 5 arranged, in this sequence, in a production direction P on a machine frame 6. On the input side of the machine frame 6, a supply roll 7 is provided on the machine frame 6, from which a film/foil 8 is unwound. In the area of the sealing station 3, a material storage unit 9 is provided, from which a cover film 10 is unwound. On the output side, a discharge device 13 in the form of a conveyor belt is provided at the packaging machine, with which finished, singulated packages are transported away. Furthermore, the packaging machine 1 comprises a feeding device, which is not shown, said feeding device gripping the film 8 and advancing it intermittently in the production direction P during each main work cycle. The feeding device may be realized e.g. by conveyor chains arranged on both sides.

In the embodiment shown, the forming station 2 is configured as a thermoforming station, in which troughs 14 are formed in the film 8 by thermoforming. The forming station 2 may here be configured such that, in the production direction P and/or in the direction perpendicular to the production direction P, several troughs are formed side by side. Downstream of the forming station 2, when seen in the production direction P, an infeed line 15 is provided, along which the troughs 14 formed in the film 8 are filled with a product 16.

The sealing station 3 is provided with a closable chamber 17 in which the atmosphere in the troughs 14 can be substituted, prior to sealing, by an exchange gas or by a gas mixture, e.g. by gas flushing.

The transverse cutting unit 4 is configured as a punch cutting through the film 8 and the cover film 10 in a direction transversely to the production direction P between neighboring troughs 14. In so doing, the transverse cutting unit 4 works such that the film 8 is not cut across the whole width, but remains uncut in at least an edge area thereof. This allows controlled further conveying by the feeding device.

In the embodiment shown, the longitudinal cutting unit 5 is configured as a blade arrangement by means of which the film 8 and the cover film 10 are cut through between neighboring troughs 14 and at the lateral edge of the film 8, so that, downstream of the longitudinal cutting unit 5, singulated packages are obtained.

The packaging machine 1 is additionally provided with a controller 18. The latter is used for controlling and monitoring the processes taking place in the packaging machine 1. A display device 19 with operating controls 20 serves to make the sequences of process steps in the packaging machine 1 visible to an operator and to influence them by the operator.

The general mode of operation of the thermoform packaging machine 1 will be described briefly in the following.

The film 8 is unwound from the supply roll 7 and conveyed into the forming station 2 by the feeding device. In the forming station 2, troughs 14 are formed in the film 8 by thermoforming. The troughs 14 are advanced, together with the material of the film 8 surrounding them, in a main work cycle corresponding to a feed length of one format, to the infeed line 15. During the feed motion or when the feeding device stands still, a product 16 is fed into the troughs 14.

Subsequently, the filled troughs 14 are advanced by the feeding device to the sealing station 3 in a subsequent main work cycle.

In the sealing station 3, the troughs may optionally be evacuated and/or flushed with a protective gas before the cover film 10 is sealed onto the troughs 14, so as to close the troughs 14 hermetically. The cross cutting unit 4 and the longitudinal cutting unit 5 ensure that the troughs are separated from one another, the troughs being finally transported away on the discharge device 13.

Figure 2:
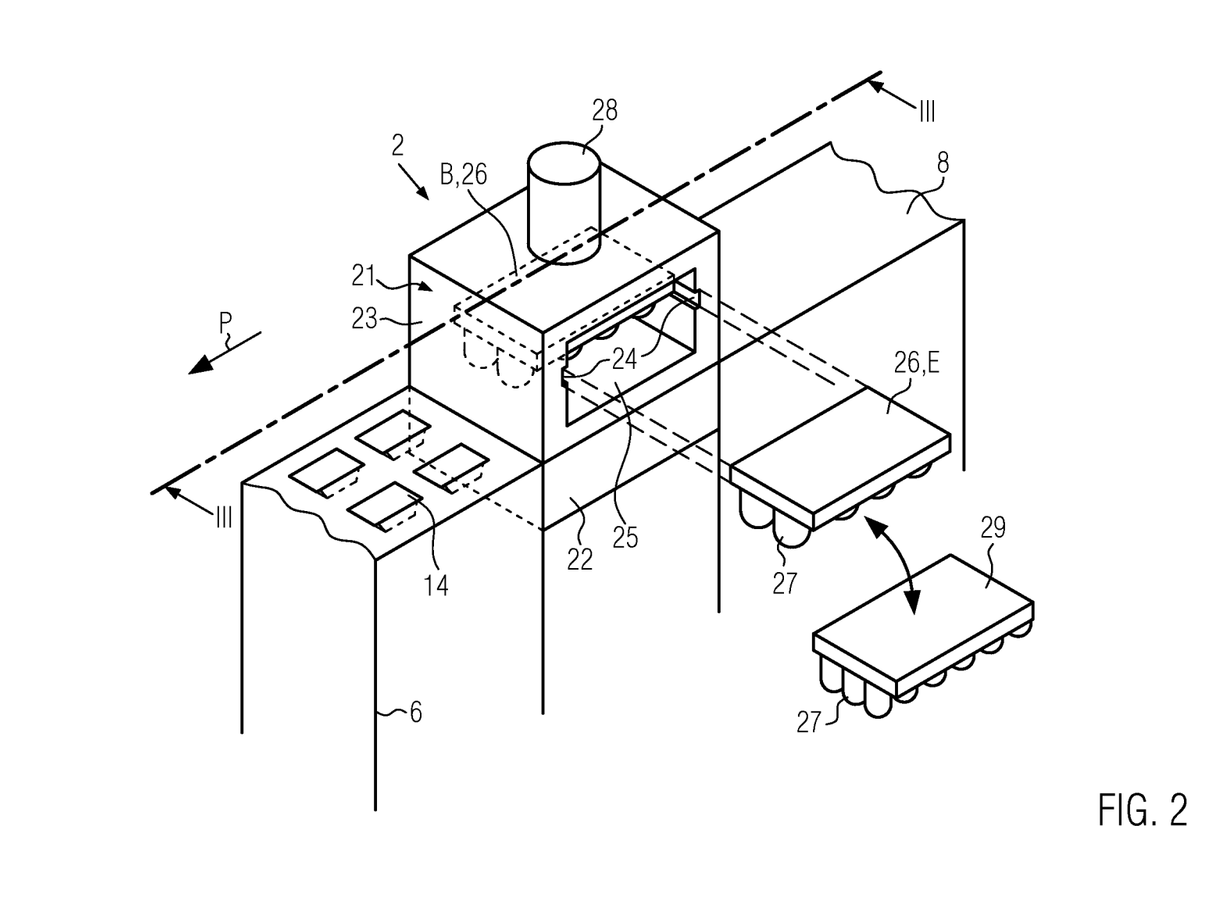
FIG. 2 is a schematic perspective view of one embodiment of the forming station with an exchange of the male die part in accordance with the teachings of the present disclosure.

FIG. 2 shows schematically a perspective view of the forming station 2. The forming station 2 is provided with a forming tool upper part 21 and a forming tool lower part 22. The forming tool upper part 21 is arranged vertically above the forming tool lower part 22 and comprises a die lid 23 configured as a housing that is open at the bottom. Two opposed inner sides of the die lid 23 have each provided thereon a respective rail 24 extending horizontally and transversely to the production direction P. A lateral opening 25 on the die lid 23 is closed with a cover (not shown) when the forming station 2 is in operation. The cover can be pivoted away or removed, so as to expose the lateral opening 25 and allow access to the interior of the die lid 23.

The interior of the die lid 23 of the forming tool upper part 21 accommodates a first male die part holding plate 26. The male die part holding plate 26 has fixed thereto at least one male die part 27 protruding downwards. In the present embodiment, the first male die part holding plate comprises e.g. eight male die parts 27 arranged in a 2×4 format. At a standby position B, shown by a dashed line, the first male die part holding plate 26 is located inside the die lid 23 and can, selectively, be drivingly connected to a male die part drive 28 at this standby position B. The male die part drive 28 may, for example, be configured as a pneumatic drive or as a servo drive and is used for generating a stroke movement H of the male die part holding plate 26 inside the forming station 2 (cf. FIG. 3) so as to generate or support thermoforming of the packaging troughs 14 by moving the male die parts 27 into the film 8. In the embodiment shown, the male die part drive 28 is mounted to the upper side of the die lid 23.

In order to allow the first male die part holding plate 26 to be replaced by a second male die part holding plate 29 having male die parts 27 fixed thereto in a different number, shape or arrangement, the first male die part holding plate 26 can be moved from its standby position B to a removal position E. To this end, the first male die part holding plate 26 will be pulled out of the forming station 2 along the rails 24, as will be explained hereinafter. After the first male die part holding plate 26 has been removed at the removal position E, the second male die part holding plate 29 can be attached to the rails 24 and moved along the rails 24 to the standby position B inside the die lid 23.

Figure 3:
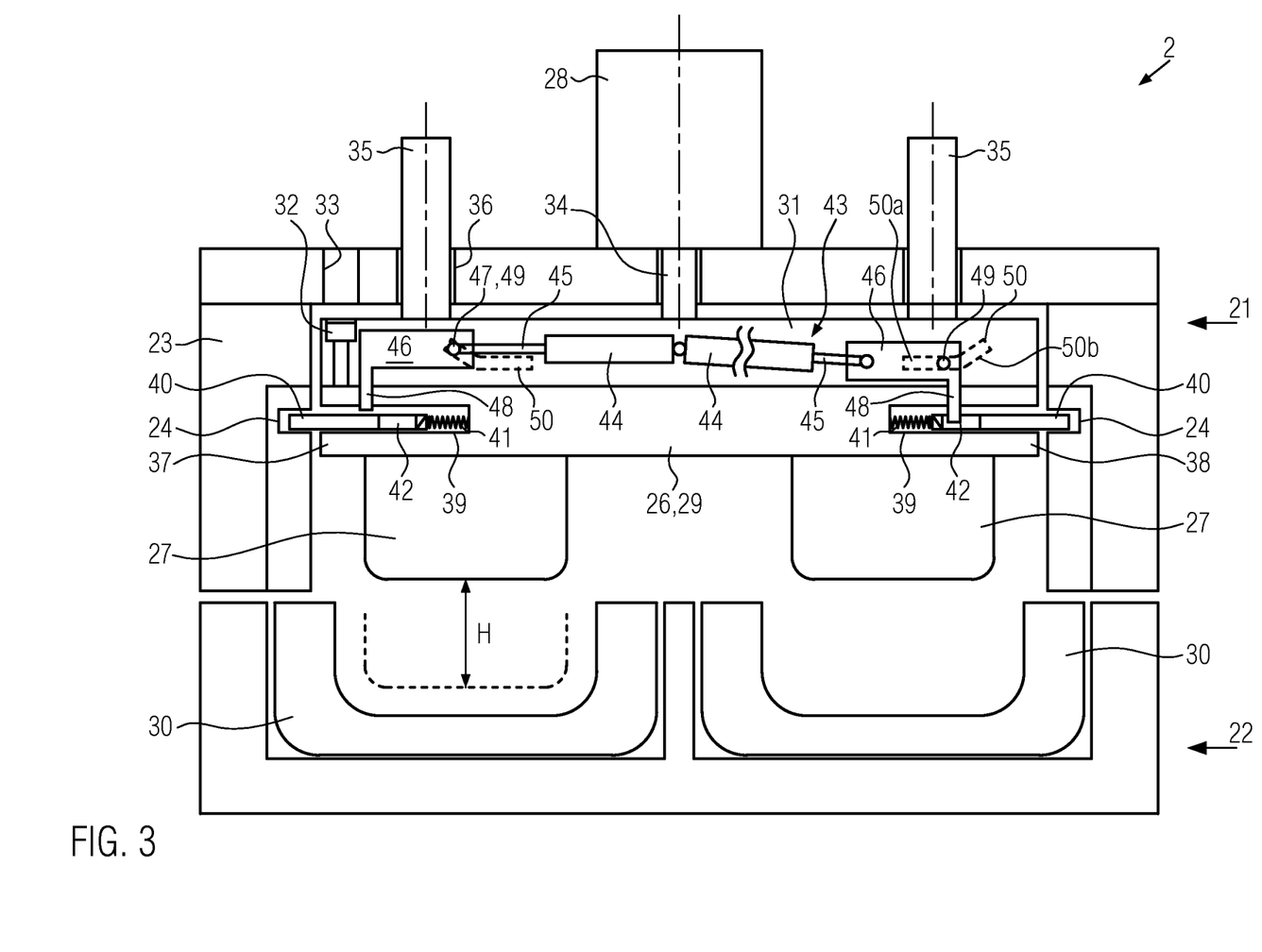
FIG. 3 is a vertical section view through the embodiment of the forming station of FIG. 2 cut along the line III-III.

FIG. 3 shows, in a horizontal section, further details of the forming station 2. The forming tool lower part 22 comprises exchangeable die inserts 30 into which the film 8 is thermoformed by applying a vacuum and by interaction with the male die part 27. When the male die part holding plate 26, 29 is exchanged, the die inserts 30 can be replaced by other die inserts so as to change the shape and/or the arrangement of the troughs 14 produced by the forming station 2. The forming tool lower part 22 can be moved by means of a lifting mechanism (not shown) into contact with the film 8 from below so as to clamp the film against the forming tool upper part 21 before the thermoforming process begins.

Above the male die part holding plate 26, 29, a base plate 31 is provided in the die lid 23, said base plate 31 remaining in the forming station 2 even when the male die part holding plate is exchanged. A fastening means 32, here e.g. in the form of a screw, establishes a releasable connection between the male die part holding plate 26, 29 and the base plate 31, in the case of which the male die part holding plate 26, 29 abuts on the base plate 31. The fastening means 32 (several of which may well be provided) is accessible from outside through an access opening 33 in the die lid 23 so that the connection between the male die part holding plate 26, 29 and the base plate 31 can be established or released.

The male die part drive 28 arranged on the upper side of the die lid 23 is permanently connected to the base plate 31 via a drive connection 34, which extends through the die lid 23, such that a movement generated by the male die part drive 28 will be transmitted via the drive connection 34 to a stroke movement of the base plate 31 inside the die lid 23. While the male die part holding plate 26, 29 is connected to the base plate 31, the male die part holding plate 26, 29 and, consequently, also the at least one male die part 27 fixed thereto take part in the stroke movement. From the upper side of the base plate 31, guide rods 35 protrude upwards, which extend through suitably configured, e.g. congruently shaped guide openings 36 in the die lid 23. During the stroke movement of the base plate 31, the guides 35 prevent, through engagement with the associated guide openings 36, tilting of the base plate 31 and of the male die part holding plate 26, 29 connected thereto, i.e. they ensure the most genuine possible vertical movement of the male die part holding plate 26, 29 and of the male die parts 27 fixed thereto.

The male die part holding plate 26, 29 has a respective opening 39 on each of two opposed sides 37, 38 thereof. In each opening 39 a guide element 40 is accommodated and supported on the male die part holding plate 26, 29 such that it is movable relative thereto. In the present embodiment, the guide elements 40 are configured for executing a linear movement relative to the male die part holding plate 26, 29, said movement taking place in the production direction P or in a direction opposite thereto, when the male die part holding plate 26, 29 is at its standby position B. The guide elements 40 are thus configured as a kind of slide in the present embodiment.

In the situation shown in FIG. 3, the male die part holding plate 26, 29 is at its standby position B. At this standby position B, the guide elements 40 are located on the level of the rails 24 formed on the inner side of the die lid 23. Each of the two guide elements 40 has associated therewith a respective rail 24.

Inside each opening 39, one or a plurality of springs 41 are provided, in the present case especially compression springs 41, which bias the respective guide element 40 towards its engagement position G projecting beyond the side 37, 38 of the male die part holding plate 26, 29, the two guide elements 40 being shown at this engagement position G in FIG. 3. As can be seen hereinafter on the basis of FIG. 6, e.g. three springs 41, which are oriented parallel to one another, may be provided for each guide element 40. The bias applied by the springs 41 leads to an increase in reliability because, if the supply of energy to the forming station 2 should be interrupted, said bias will move the guide elements 40 to the position of engagement G with the rails 24, said engagement position G securing the male die part holding plate in position.

In the embodiment shown, the respective guide elements 40 are each configured in the form of a plate. They are provided with a recess or, as in the case of the embodiment shown, even with a through-opening 42.

A driver driving unit 43, which is configured for driving the at least one guide element 40 at least from its engagement position G to its retracted position R, is provided on or in the base plate 31. Whereas, in principle, a separate driver driving unit 43 (or some other kind of driving unit) could be provided for each guide element 40, the driver driving unit 43 provided in the present embodiment is common to all the guide elements 40. This driver driving unit 43 comprises a piston drive 44 having at least one, substantially horizontally movable piston rod 45. The piston rod 45 is coupled to a driver bar 46 at the outer end thereof, e.g. at a point of articulation 47. The driver bar 46 has a driver hook 48 that is angled downwards. This driver hook 48 is configured and dimensioned for temporarily entering the opening 42 of the associated guide element 40 so as to entrain the guide element 40, and for being released from said opening 42 subsequently.

A bolt 49 protrudes laterally outwards from the driver bar 46 in a direction transversely to the production direction P, i.e. in FIG. 3 into the drawing plane or out of the drawing plane. The bolt 49 may be located at the point of articulation 47, as can be seen from the left driver bar 46, or—as shown at the right driver bar 46—it may be located at some other point of the driver bar 46. The bolt 49 protrudes into a slotted link 50 formed on the base plate 31. The slotted link 50 comprises a respective horizontal section 50a and an outwardly ascending section 50b, which adjoins said horizontal section 50a.

FIG. 3 shows the piston drive 44 of the driver driving unit 43 on the left in its extended position, in which the piston rod 45 has been moved outwards. The bolt 49 is at the highest point of the ascending section 50b of the slotted link 50. This has the effect that, in the representation on the left, the driver bar 46 is at its maximum raised position, in which its driver hook 48 is no longer in engagement with the opening 42 in the associated guide element 40.

If the piston drive 44 is now contracted, the bolt 49 will move inwards along the slotted link 50. As the bolt 49 moves along the ascending section 50b, the bolt 49 and, consequently, also the driver bar 46 connected thereto moves down, so that—as shown in FIG. 3 on the right—the driver hook 48 enters into engagement with the opening 42 of the associated guide element 40. If the piston drive 44 is now contracted still further, the driver bar 46 will move horizontally inwards, while its bolt 49 moves along the horizontal section 50a of the slotted link 50. In the course of this process, the driver hook 48 entrains the guide element against the bias of the spring 41 and thus moves the guide element 40 from the engagement position G to the retracted position R. In the retracted position R, the guide element 40 is completely out of engagement with the associated rail 24.

By means of the ascending section 50b, the slotted link 50 is configured for raising the driver bar 46 during extension of the driver bar 46 and for lowering the driver bar 46 during retraction of the driver bar 46. The piston drive 44 is here supported on the base plate 31 such that its vertical position is variable relative to the base plate 31. In particular, the piston drive 44 is motion-coupled to, i.e. its position depends on, the raising and/or lowering of the at least one driver bar 46. It follows that, if the driver bar 46 is at a raised position (shown on the left), also the piston drive 44 or at least the piston rod 45 of the latter will be at a higher position relative to the base plate 31 than at a contracted position of the piston drive 44 (shown on the right).

Figure 4:
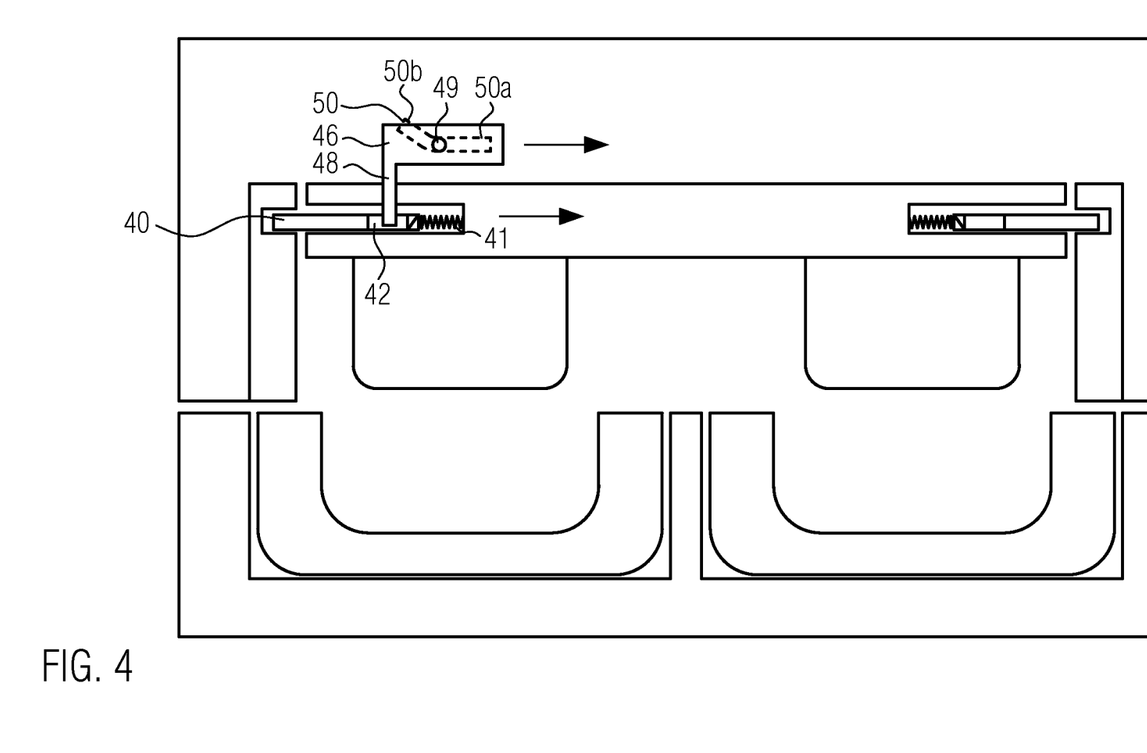
FIG. 4 is a simplified representation of the embodiment of FIG. 3 showing a retracted guide element.

FIG. 4 shows a simplified representation according to FIG. 3, in which, during the contraction of the piston drive 44, the bolt 49 has reached the transition from the ascending section 50b to the horizontal section 50a of the slotted link 50. At this moment in time, the driver hook 48 of the driver bar 46 has entered the opening 42 in the guide element 40. During the continued contraction of the piston drive 44, the driver hook 48 will now move the guide element 40 to the right against the force of the spring 41.

Figure 5:
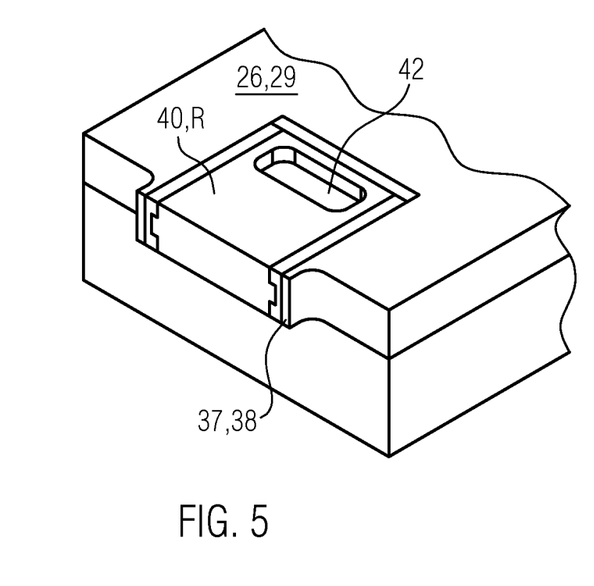
FIG. 5 is a perspective view of one embodiment of the male die part holding plate with a guide element at its retracted position in accordance with the teachings of the present disclosure.

FIG. 5 shows the guide element 40, which is accommodated in the opening 39 provided in the male die part holding plate 26, 29, at its retracted position R. At this retracted position R, the guide element 40 does not project, or only very slightly projects, beyond the outer side 37, 38 of the male die part holding plate 26, 29. The guide element 40 is not higher than the opening 39, i.e. it does not project beyond the top of the male die part holding plate 26, 29 either.

Figure 6:
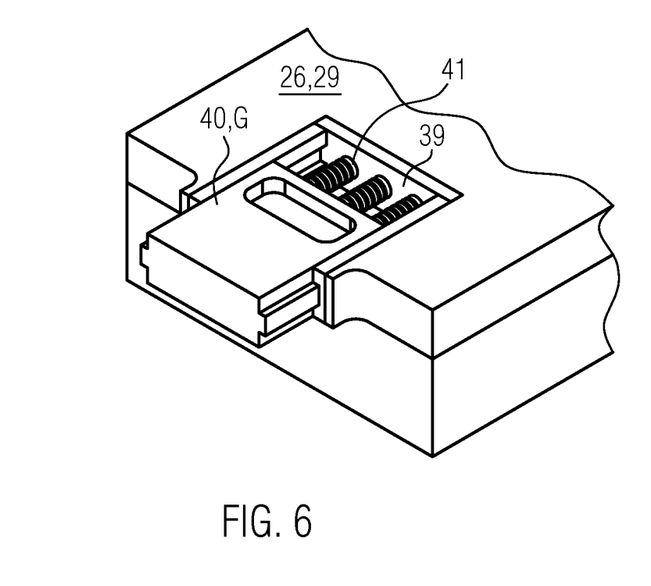
FIG. 6 is a perspective view of the embodiment of FIG. 5 with the guide element at its engagement position.

FIG. 6 shows the guide element 40 in its engagement position G, in which—due to the force of the three compression springs 41—it is extended outwards and projects now beyond the side 37, 38 of the male die part holding plate 26, 29. In this engagement position G, the guide element 40 can be in engagement with the rail 24. If the male die part holding plate 26, 29 is in its standby position B inside the forming station 2 at this moment in time, it can, when the lateral opening 25 has been opened, be pulled outwards along the rails 24 to a removal position E, in which it can be removed from the forming station 2. Subsequently, another male die part holding plate 26, 29 with guide elements 40 in engagement position G can be attached to the rails 24 and can then be moved along the rails 24 to the standby position B inside the forming station 2, as shown in FIG. 2. In the standby position B, the fastening means 32 are accessible through the access openings 33 and can be tightened so as to connect the male die part holding plate 26, 29 to the base plate 31.

Following this, the guide elements are moved to their retracted position R outside the rails 24. This is done by contracting the piston drive 44 of the driver driving unit 43 and by the resultant retraction of the driver bars 46 into the opening 42 of the associated guide elements 40. As soon as the driver hooks 48 of the driver bars 46 are in engagement with the openings 42, the guide elements 40 are moved inwards against the force of the spring 41 and are thus moved to their retracted position R. When the guide elements 40 are no longer in engagement with the rails 24, the male die part holding plate 26, 29 can execute a stroke movement H generated by the male die part drive 28, without the rails 24 taking part in this movement.

Starting from the above described embodiment, the present invention may be modified or supplemented in many respects. For example, it is imaginable to configure the rails 24 as telescopic rails, which are laterally pulled out of the forming station 2 when a tool is changed. This could help to reliably guide the male die part holding plate from the standby position to the removal position and back. It would also be imaginable to provide position sensors that detect when defined positions are occupied e.g. by the male die part holding plate, the guide elements or the drive for the guide elements. This, in turn, allows security queries which will not allow the forming station to operate until the monitored components arrived at their defined position. By means of the position sensors it can, for example, be detected whether the male die part holding plate is at its standby position or whether the guide elements are at their retracted position, where they are out of engagement with the rail 24, so that the stroke movement of the male die part holding plate will be allowed.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A forming station for a thermoform packaging machine, comprising a forming tool upper part with a die lid and a forming tool lower part, wherein the forming tool upper part comprises a male die part holding plate including at least one male die part fixed thereto and which is displaceable along at least one rail provided on or in the die lid;

and wherein the forming station comprises a male die part drive, which is drivingly connected to the male die part holding plate for generating a stroke movement of the male die part holding plate relative to the die lid, wherein the male die part holding plate has provided thereon at least one guide element, which is movable relative to the male die part holding plate between an engagement position, in which the guide element is adapted to be brought into engagement with an associated rail, and a retracted position in which the guide element is out of engagement with the associated rail.

2. The forming station according to claim 1, wherein opposed sides of the male die part holding plate have each provided thereon a respective guide element that is engageable with a respective associated rail.

3. The forming station according to claim 2, wherein the guide elements on the opposed sides of the male die part holding plate are movable synchronously and in opposite directions relative to one another.

4. The forming station according to claim 1, wherein the at least one guide element is biased towards its engagement position using a spring.

5. The forming station according to claim 1, wherein the forming tool upper part comprises a driver driving unit configured for driving the at least one guide element at least from the engagement position to the retracted position.

6. The forming station according to claim 1, wherein a plurality of guide elements are provided, and that the forming tool upper part comprises a driver driving unit which is common to all the guide elements.

7. The forming station according to claim 5, wherein the driver driving unit is arranged on or in a base plate with which the male die part holding plate can releasably be connected for establishing a driving connection to the male die part drive.

8. The forming station according to claim 5, wherein the driver driving unit comprises at least one driver bar configured for moving into an opening of a guide element.

9. The forming station according to claim 8, wherein the forming tool upper part has provided thereon a slotted link configured for raising the driver bar during extension of the driver bar and/or for lowering the driver bar during retraction of the driver bar.

10. The forming station according to claim 9, wherein the driver driving unit comprises a piston drive, which is motion-coupled to the raising and/or lowering of the at least one driver bar.

11. The forming station according to claim 1, wherein the male die part holding plate comprises an opening in which the guide element is accommodated in the retracted position.

12. A thermoform packaging machine comprising a forming station according to claim 1.

* * * * *